United States Patent
Jain et al.

(10) Patent No.: US 11,975,451 B2
(45) Date of Patent: May 7, 2024

(54) SIMULATION-IN-THE-LOOP TUNING OF ROBOT PARAMETERS FOR SYSTEM MODELING AND CONTROL

(71) Applicant: Mitsubishi Electric Research Laboratories, Inc., Cambridge, MA (US)

(72) Inventors: Siddarth Jain, Cambridge, MA (US); Jeroen van Baar, Arlington, MA (US); Radu Ioan Corcodel, Quincy, MA (US); Alan Sullivan, Cambridge, MA (US); Mouhacine Benosman, Boston, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 284 days.

(21) Appl. No.: 17/214,810

(22) Filed: Mar. 27, 2021

(65) Prior Publication Data

US 2022/0305646 A1 Sep. 29, 2022

(51) Int. Cl.
*B25J 9/16* (2006.01)
*B25J 13/08* (2006.01)

(52) U.S. Cl.
CPC .............. *B25J 9/163* (2013.01); *B25J 9/1671* (2013.01); *B25J 13/088* (2013.01)

(58) Field of Classification Search
CPC ........ B25J 9/163; B25J 9/1671; B25J 13/088; G05B 2219/39014; G05B 2219/40515
See application file for complete search history.

(56) References Cited

U.S. PATENT DOCUMENTS

| | | | | |
|---|---|---|---|---|
| 5,550,953 A | * | 8/1996 | Seraji | B25J 9/162 700/262 |
| 6,278,906 B1 | * | 8/2001 | Piepmeier | B25J 9/1607 700/59 |
| 10,556,336 B1 | * | 2/2020 | Bai | B25J 9/1671 |
| 10,800,040 B1 | * | 10/2020 | Beckman | B25J 9/1605 |
| 11,213,946 B1 | * | 1/2022 | Bai | G06N 20/00 |

(Continued)

OTHER PUBLICATIONS https://web.archive.org/web/20190621070838/https://www.wavemetrics.com/products/igorpro/dataanalysis/signalprocessing/smoothing (Year: 2019).*

*Primary Examiner* — Adam R Mott
*Assistant Examiner* — Sagar Kc
(74) *Attorney, Agent, or Firm* — Gene Vinokur; Hironori Tsukamoto

(57) ABSTRACT

A system for parameter tuning for robotic manipulators is provided. The system includes an interface configured to receive a task specification, a plurality of physical parameters, and a plurality of control parameters, wherein the interface is configured to communicate with a real-world robot via a robot controller. The system further includes a memory to store computer-executable programs including a robot simulation module, a robot controller, and an auto-tuning module a processor, in connection with the memory. In this case, the processor is configured to acquire, in communication with the real-world robot, state values of the real-world robot, state values of the robot simulation module, simultaneously update, by use of a predetermined optimization algorithm with the auto-tuning module, an estimate of one or more of the physical, and said control parameters, and store the updated parameters.

28 Claims, 9 Drawing Sheets

(56) References Cited

U.S. PATENT DOCUMENTS

| | | | |
|---|---|---|---|
| 2009/0143871 A1* | 6/2009 | Gao | G05B 13/04 |
| | | | 703/2 |
| 2016/0041536 A1* | 2/2016 | Benosman | G05B 13/048 |
| | | | 700/31 |
| 2019/0126472 A1* | 5/2019 | Tunyasuvunakool | |
| | | | G06N 3/084 |
| 2019/0337154 A1* | 11/2019 | Holson | B25J 9/1666 |
| 2020/0249654 A1* | 8/2020 | Edwards | G05B 19/414 |
| 2020/0276704 A1* | 9/2020 | Sindhwani | B25J 9/1661 |
| 2021/0276187 A1* | 9/2021 | Tang | G06N 3/08 |
| 2022/0105625 A1* | 4/2022 | Guo | B25J 9/1671 |

* cited by examiner

SIMULATION-IN-THE-LOOP TUNING OF ROBOT PARAMETERS FOR SYSTEM MODELING AND CONTROL

TECHNICAL FIELD

The present invention relates generally to tuning of robot parameters, for system modeling and control, and more particularly to a method and an apparatus with a robotic simulation, data-driven modeling, sensing, and optimization for tuning parameters of a real robot and a robot simulation system.

BACKGROUND

Industrial robots are widely used in a variety of manufacturing operations, including material handling, assembly, inspection, and pick and place processing tasks. For successful operation and deployment in such settings, precision positioning and fast point-to-point motions are desired. However, the speed with which a task can be achieved by robotic manipulators are limited by several factors, including their physical properties, dynamic properties, the actuator limitations, and control objectives or constraints. Pertaining to such requirements, problems of unwanted dynamics including overshoots and residual vibrations may be induced in the robot motions. Consider for example the fact that the robot cannot instantaneously accelerate or decelerate due to inertia. Therefore, if the desired trajectory slows down faster than the robot's motors can brake, the robot will overshoot the desired target. The limitation of execution speed thus impacts productivity. The goal of optimal productivity thus means reducing the duration of every cycle of robot operation. Robotic tasks thus require control objectives and task constraints for optimal execution, which in many scenarios may be presented as a restriction on the freedom of motion of robot's end-effector or joints in the joint space.

Simulations for robotic applications are attractive solutions for training and testing robotic agents as they provide cost effective data source and alleviate many concerns for example, safety, wear and tear of robot etc. Many state-of-the-art learning approaches rely on robotic simulators for the training process and many times the training is only possible in simulation pertaining to the requirement of large number of samples. However, system behaviors successful in simulation does not directly transfer to the real-world robot due the reality gap, i.e., the simulation is some approximation of the real world. Furthermore, regular wear and tear over time may change the physical properties of the physical robot which further widens the reality gap. Thus, control and learning algorithms developed for a simulated robotic system may fail to perform in real environments when deployed on real robot hardware. Such discrepancies may arise from inaccurate model parameters or under-modeling.

Our insight is to perform auto-tuning for simultaneous update of the system model and control parameters, both on a real-robot and a robot simulator that simulates the real-world physical robot.

We propose a simulation-in-the-loop method and system of parameter tuning of a real robot, in which both the system modeling and control objectives or constraints are satisfied, bridging the reality gap between the real and simulated robot systems.

SUMMARY

Brief Description of the Drawings

The accompanying drawings, which are included to provide a further understanding of the invention, illustrate embodiments of the invention and together with the description explain the principle of the invention.

DETAILED DESCRIPTION

Figure 1:
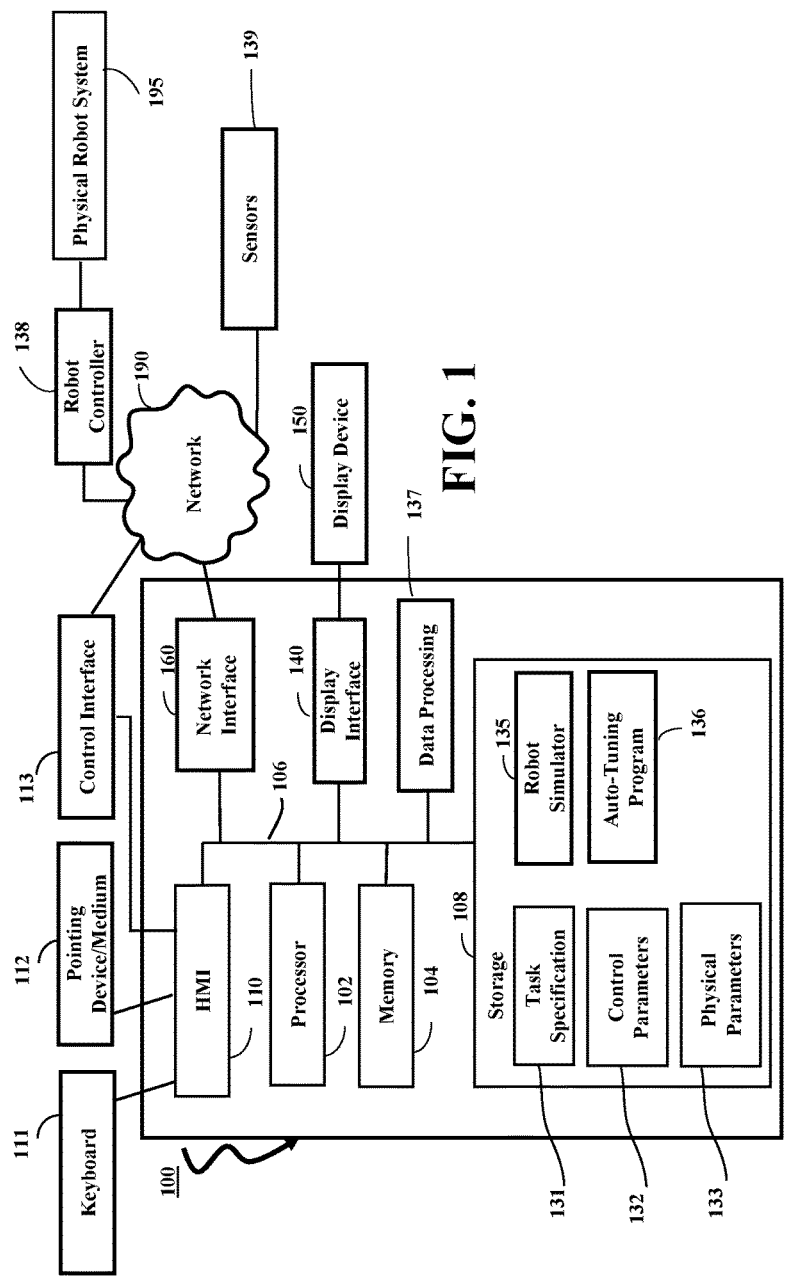
FIG. 1 shows a block diagram of a parameter tuning system for simulation and real-robot system according to some embodiments of the present invention.

Various embodiments of the present invention are described hereafter with reference to the figures. It would be noted that the figures are not drawn to scale elements of similar structures or functions are represented by like reference numerals throughout the figures. It should be also noted that the figures are only intended to facilitate the description of specific embodiments of the invention. They are not intended as an exhaustive description of the invention or as a limitation on the scope of the invention. In addition, an aspect described in conjunction with a particular embodiment of the invention is not necessarily limited to that embodiment and can be practiced in any other embodiments of the invention.

FIG. 1 shows a block diagram of a parameter tuning system 100 for robotic manipulators according to some embodiments. The parameter tuning system 100 is configured to update control parameters and physical parameters derived from a physical robot system 195. A physical robot system denotes an embodiment of a robot arm in the real world. A robot system may also be denoted as robot arm, robotic manipulator, or simply robot. The classifier 'real-world' contrasts a physical system with a simulator model of the robot. The control parameters and physical properties are used in both a simulated version of the robot and the physical real-world robot 195, in accordance with some embodiments. The parameter tuning system 100 includes a processor 102 configured to execute stored instructions, as well as a memory 104 that stores instructions that are executable by the processor. The processor 102 can be a single core processor, a multi-core processor, a computing cluster, or any number of other configurations. The memory 104 can include random access memory (RAM), read only memory (ROM), flash memory, or any other suitable memory systems. The processor 102 is connected through a bus 106 to one or more input and output devices.

The system 100 is configured to perform parameter tuning for both system modeling and control of a real-world robot 195 and a simulator model of the robot 135, such that the behavior of the simulated robot closely matches the behavior of the real-world robot 195. Such a simulation-in-the-loop update of the system modeling and control parameters utilized by the simulated robot 135 and real-world robot 195 simultaneously improves the simulated robot's dynamical model and the real-world robot's performance for the task.

The system 100 can include a storage device 108 adapted to store task specification 131 related to the task for the robot 195 to perform; control parameters 132 used by the robot controller 138 and the robot simulator 135 to control the robot's movements; physical parameters 133 used by the robot simulator 135 and the robot controller 138. The storage device 108 can be implemented using a hard drive, an optical drive, a thumb-drive, an array of drives, or any combinations thereof. The storage device 108 includes an auto-tuning program 136. The auto-tuning program 136 is responsible for computing updated control parameters 132 and physical parameters 133. The auto-tuning program 136 is stored as a collection of algorithms, comprised of mathematical formulas implemented using a programming language, implemented as computer code using a programming language, where the code is interpreted and executed by the processor 102. Finally, the storage device 108 includes a robot simulator 135. The robot simulator 135 is stored as a collection of algorithms, comprised of mathematical formulas, implemented as computer code using a programming language, where the code is interpreted and executed by the processor 102.

The task specification 131 contains some description of performing a task. An example of a task is for the end effector to move from an initial location in 3D space, to another location in 3D space, open the gripper, go to the next location in 3D space, close the gripper to grasp an object 240, and move to a final location in 3D space. Each item for the task may be referred to as a subtask or waypoint. A motion planner or path planner may be executed on the task to further refine the task, for example to avoid obstacles in the environment. We assume that the output of a motion or path planner is itself a task, for example a task with additional waypoints to avoid some obstacle. A task description 131 further contains a control objective. An example of a control objective is for the robot to obtain some desired accuracy, e.g., the end effector location in 3D space is within some distance tolerance from a desired location specified by the task. Finally, a task description 131 may have task constraints. An example of task constraints may be that the robot should not enter a region of the 3D workspace around the robot. The goal for the robot arm is to perform the task as fast as possible under the control objective and task constraints. Note that task constraints may also be specified as control objectives in the task description.

Control parameters 132 relate to the controller 138 for the robot. An example of control parameters 132 are the parameters for a filter, e.g., a convolutional filter or the parameters of a neural network. Control parameters 132 are also used by the robot simulator 135. Physical parameters 133 relate to the dynamics of the robot. Physical parameters 133 may include mass, center of mass, inertia, link length, friction coefficients, damping coefficients, etc.

A human machine interface 110 within the parameter tuning system 100 can connect the system to a keyboard 111 and pointing device 112, wherein the pointing device 112 can include a mouse, trackball, touchpad, joystick, pointing stick, stylus, or touchscreen, among others. The system 100 can be linked through the bus 106 to a display interface 140 adapted to connect the system 100 to a display device 150, wherein the display device 150 can include a computer monitor, camera, television, projector, or mobile device, among others.

The parameter tuning system 100 includes a data processing module 137 which is connected via the bus 106 to process received robot states and received sensor data from the sensors 139. The auto-tuning program 136 is responsible for updating the control parameters and physical parameters.

The robot controller 138 controls the motion of the robot to complete a task determined by the task specification 131. In the preferred embodiment the robot controller 138 receives input from the parameter tuning system 100 and sends commands to the physical robot system 195. In another embodiment the robot controller 138 is incorporated into the robot system 195. In yet another embodiment the robot controller 138 is part of the parameter tuning system 100.

A network interface controller 160 is adapted to connect the parameter tuning system 100 through the bus 106 to a network 190. In the preferred embodiment data from the robot controller is received through the network 190 and presented as input to the data processing 137 via the bus 106, for further processing, e.g., by the robot simulator 135 and auto-tuning system 136. In another embodiment, the robot controller 138 is connected to the parameter tuning system 100 via a dedicated connection, for example using a data serial cable. In the preferred embodiment one or more sensors 139 are connected to the network 190. In another embodiment the sensors may be connected via a dedicated connection, for example using a data serial cable. Sensors 193 may include one or more of laser displacement sensors, accelerometers, or cameras. It is understood that other sensors or a combination of sensors, may be used. The sensor data may be processed by the data processing 137 in the parameter tuning system 100.

Figure 2:
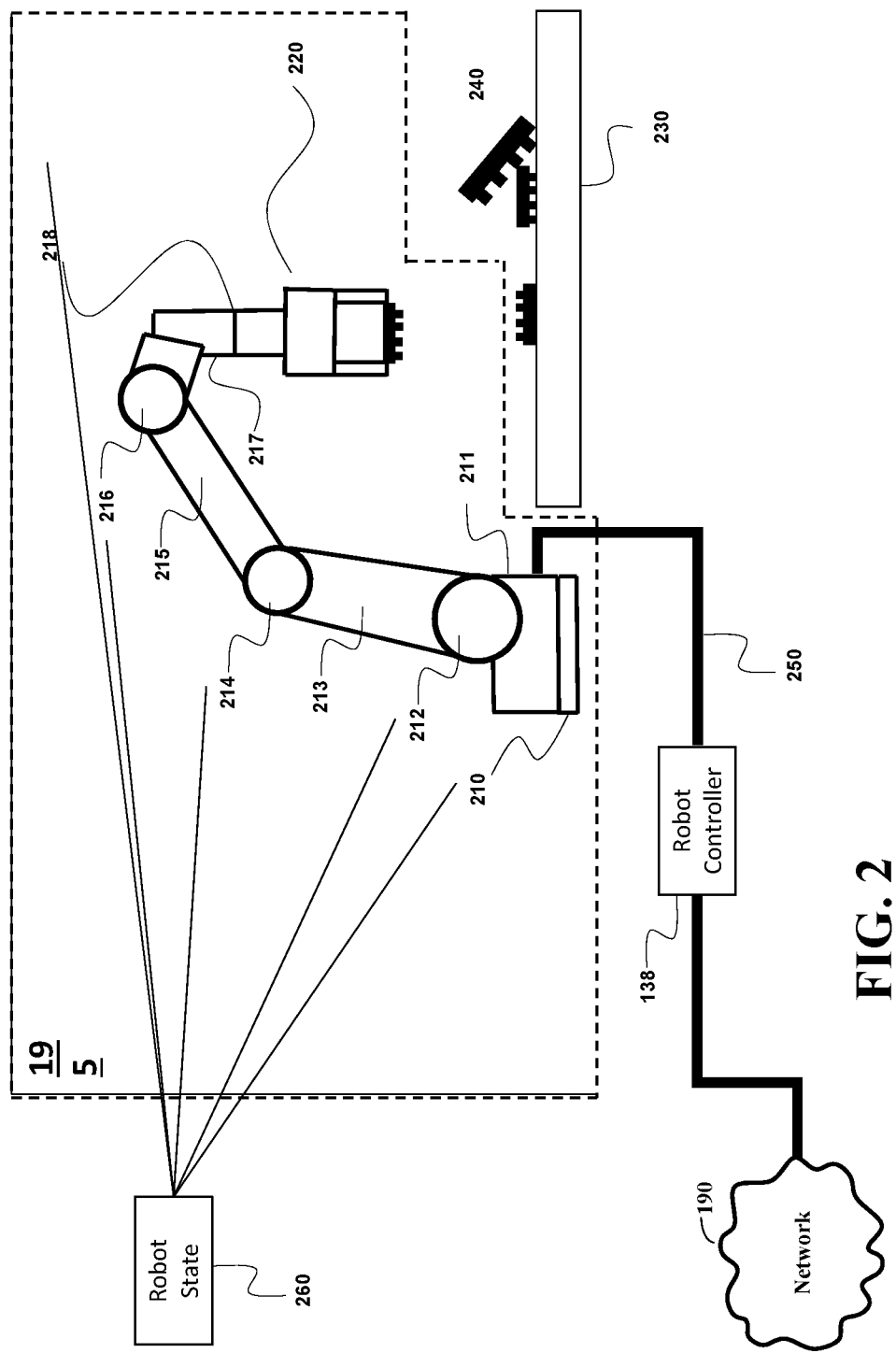
FIG. 2 shows a depiction of a physical robot system, according to some embodiments of the present invention.

FIG. 2 shows a depiction of a physical robot system. In this description a physical robot system 195 is a set of components 211, 213, 215, 217 linked by joints 210, 212, 214, 216, 218. In the described embodiment, the joints 210, 212, 214, 216, 218 are revolutionary joints, but in another embodiment, they can be sliding joints, or other types of joints. The collection of joints determines the degrees of freedom for the robot arm 195. The robot arm 195 has five degrees of freedom, one for each joint 210, 212, 214, 216, 218. In another embodiment the robot may contain six joints. The robot arm 195 has an end effector 220 attached. The end effector 220 is attached to one of its components, typically the last component 217 when the components are considered in a chain. An end effector 220 could be a parallel jaw gripper. A parallel jaw gripper has two parallel fingers whose distance can be adjusted relative to one another. Many other end effectors can be used instead, for example an end effector which contains a welding tip. The joints 210, 212, 214, 216, 218 can be adjusted to achieve desired configurations for the components. A desired configuration may relate to a desired position in Euclidean space, or desired values in joint space. The joints can also be commanded in the temporal domain to achieve desired (angular) velocity and/or (angular) acceleration. The joints have embedded sensors, which can report the state of the joint. The reported state may be the angle, the current, the velocity, the torque, the acceleration or any combination thereof. The reported collection of joint states is referred to as the robot state 260. The commands for the robot are received from the robot controller 138 via connection 250, and the robot state is received by the robot controller 138 via connection 250. In the preferred embodiment the connection 250 is a dedicated data cable. In another embodiment the connection 250 is an ethernet cable. Robots can perform a variety of different tasks. For example, a robot can pick an object to be placed in a bin. Objects 240 are typically presented on some working surface 230. The working surface and objects 240 positions and orientations may be part of the task description 131. This description will consider the task of moving from some start location to some end location. However, it is understood that the claimed approach applies to other, possibly more complex tasks.

When we refer to a robot, without the classifications "physical", "real", or "real-world", this could mean a physical robot system 195, or a robot simulator 135 which aims to faithfully simulate the behavior of the physical robot system 195. A robot simulator 135 is a program consisting of a collection of algorithms based on mathematical formulas to simulate a real-world robot's kinematics and dynamics. In the preferred embodiment the robot simulator 135 also simulates the robot controller 138. A robot simulator 135 may generate data for 2D or 3D visualization of the robot, which may be output to the display device 150 via the display interface 140.

Figure 3A:
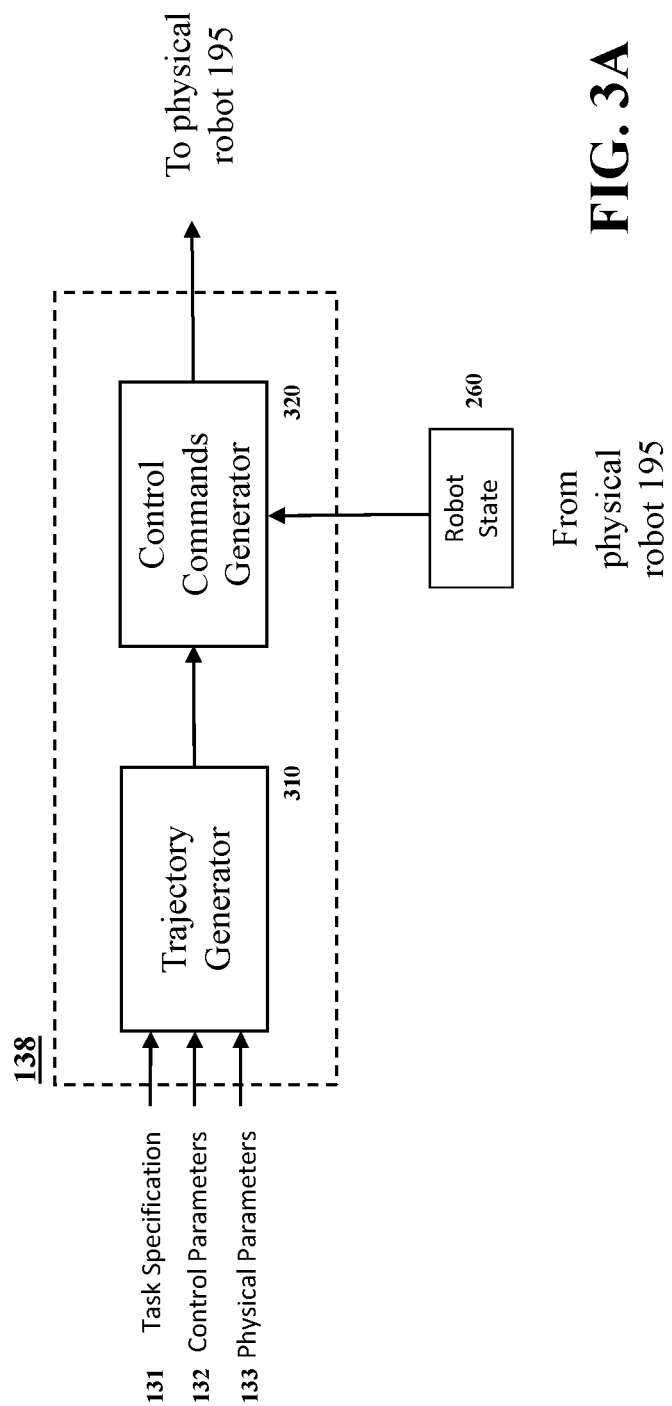
FIG. 3A shows a block diagram of the robot controller, according to some embodiments of the present invention.

FIG. 3A shows a block diagram of a robot controller. In the preferred embodiment the robot controller 138 takes as input a task description 131, physical parameters 133 and control parameters 132. A trajectory generator 310 generates a desired trajectory for the robot to follow. A trajectory is defined as a set of values specified for a set of discrete time values. Each item in the set of values is thus associated with a time step t. For a given task a certain number of time steps are considered: $t_0, \ldots, t_f$. At time t=0 the robot is in some initial configuration. For example, the initial configuration is some feasible joint configuration as required by the task or determined by a human robot operator. At time t=f the robot is in some final configuration as determined by the task description 131. A control commands generator 320 takes as input the generated desired trajectory from the trajectory generator 310 and a robot state 260 and produces commands to send to the physical robot 195. An example of commands generated by 320 are torques to apply to the motors of the robot 195. The control commands generator generates commands for every time step in the generated desired trajectory from the trajectory generator 310. In another embodiment the trajectory generator may be separate from the robot controller 138.

We refer to the set of values at discrete time steps as a trajectory since the values constitute some path with velocities and accelerations in its each point, in some space. For example, the trajectory values define a path in joint space, or a path in Cartesian space. We assume that the trajectories are smooth, i.e., there are no discontinuities for which no robot configuration, or motion exists. As an example, trajectories will not require instantaneous accelerations.

Figure 3B:
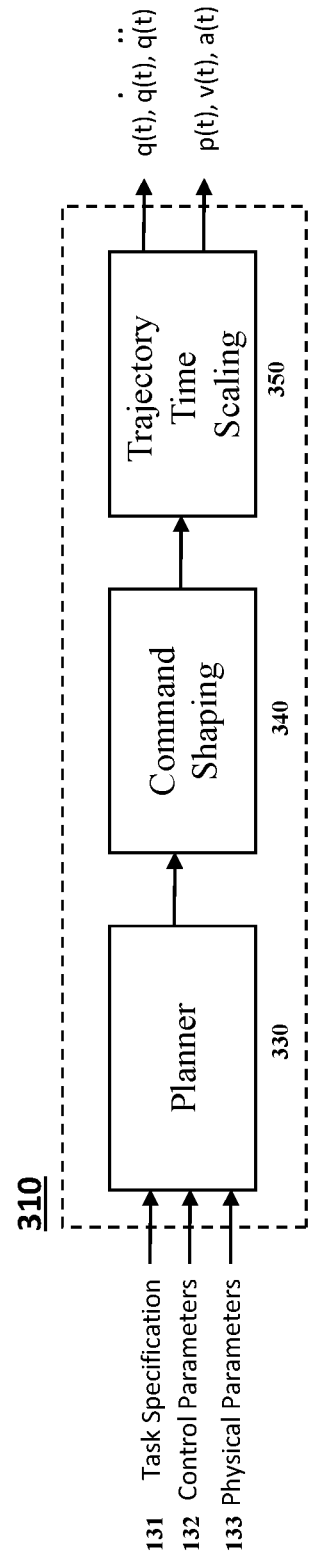
FIG. 3B shows a block diagram of an embodiment of a trajectory generator, according to some embodiments of the present invention.

FIG. 3B shows a block diagram of an embodiment of a trajectory generator 310. A task description 131, physical parameters 133 and control parameters 132 are input to a planner 330. A planner 330 is responsible for the initial path, or trajectory. A planner 330 can be a simple linear interpolation between a start and end position. However, a planner 330 can also be more sophisticated and avoid collisions, either with objects in the environment, or with the physical robot 195 itself. The planner 330 generates a path that takes the robot's physical capabilities into account. For example, it avoids paths that would require velocities that exceed the maximum joint velocity. In some embodiments an additional path planning may process the task descriptions and produce a sequence of subtasks. These subtasks can be specified as intermediate waypoints along an initially planned path for the entire task. Each subtask is then presented to the trajectory generator 310. It is understood that other combinations of path planning and planner 330 are possible. The command shaping 340 considers the output from the planner and together with the control parameters 132 and physical parameters 133 transforms the output from the planner 330 in order to satisfy the task constraints and control objective. In one embodiment the transformation can be a convolutional filter. In another embodiment the transformation can be represented by a neural network. The transformed path or trajectory that is output from the command shaping 340 undergoes a trajectory time scaling 350. The trajectory time scaling ensures that the time steps and time intervals in the trajectory are valid for the physical robot 195. In one embodiment the command shaping 340 and trajectory time scaling 350 are interchanged. The trajectory generator 310 can also be represented by a neural network that generates a control policy responsible for producing a valid trajectory for the physical robot 195 based on the task specification 131. In such embodiment the control parameters 133 are parameters of the neural network. It is understood that the trajectory generator 310 may have different embodiments.

The output from the trajectory generator 310 is a desired trajectory of values at discrete time steps. The controller 138 will aim to move the robot in such a way that the desired trajectory is followed as closely as possible. The desired trajectory will be denoted as:

$$q_d(t) \qquad (1)$$

The values at each time step t in $q_d(t)$ can be one or more scalar or vector values. An example of three scalar values at a time step t is (p(t), v(t), a(t)) which comprises of a position, velocity and acceleration in Cartesian space, for example for the end-effector. An example of vector values at a time step t is $(\bar{q}(t), \dot{\bar{q}}(t), \ddot{\bar{q}}(t))$ which denotes the angle, angular velocity and angular acceleration vectors for the joints, respectively. It is understood that different combinations and values can be obtained. For clarity we do not explicitly distinguish between scalars and vectors, and we omit the — notation.

Figure 4:
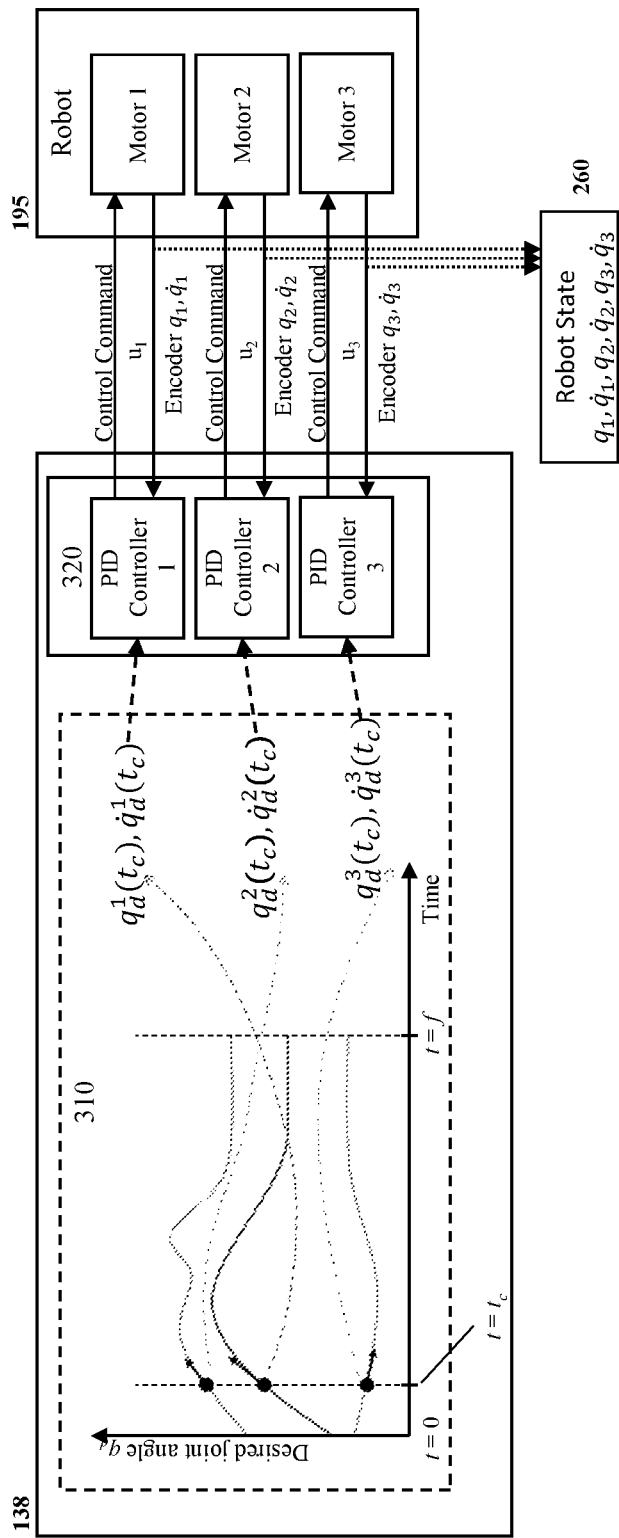
FIG. 4 shows an example embodiment of a controller and physical robot, according to some embodiments of the present invention.

FIG. 4 shows an example embodiment of a controller 138 and physical robot 195. In this embodiment a physical robot 195 has three motors, one for each of the three joints. The trajectory generator 310 generates a desired trajectory for the robot, which can be interpreted as separate trajectories for each joint. In this example the trajectory generator 310 generates desired joint angle values $q_d^i$ and the first derivative with respect to time, i.e., the angular velocity $\dot{q}_d^i$. The command generator 320 considers the angle and angular velocity at current time $t_c$: $q_d^i(t_c), \dot{q}_d^i(t_c)$. The command generator 320 generates control commands $u_i$ using PID controllers. The control commands $u_i$ are sent to corresponding motors of the physical robot 195. The control command applied to the robot motor cause the robot to move. An example of the control command could be a torque value. Encoders embedded with the motors report back their corresponding joint angle and angular velocity $q_i, \dot{q}_i$. The collection of $q_i, \dot{q}_i$'s for the three motors is referred to as the robot state 260. Other values may be reported by the encoders, for example current or joint acceleration. The trajectory generated by the trajectory generator 310 has the characteristic that the angle values near and at time t=f are constant, and therefore the first derivatives with respect to time is zero. In other words, the desired trajectory is aiming for the robot to arrive at a configuration of the joint angles where the angular velocities are zero, and therefore the robot should stop moving. Due to dynamics the robot may not be able to precisely follow the desired trajectory, and "overshoot" its target. The PID controllers in 320 correct for such deviations. The robot may therefore have oscillatory behavior in its trajectory when tracking the desired trajectory $q_d$. We note that FIG. 4 is for the purpose of illustration, and other interpretations are possible.

Figure 5:
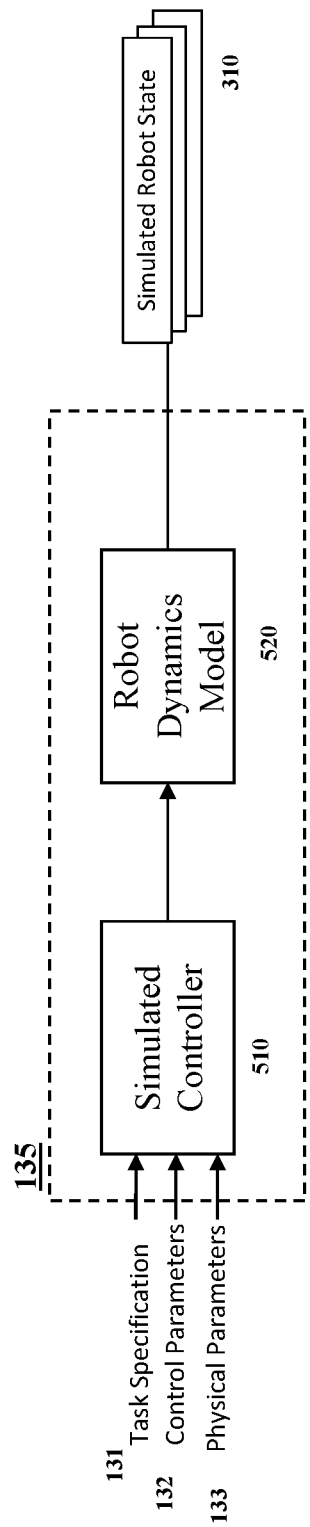
FIG. 5 shows a block diagram of a robot simulator, according to some embodiments of the present invention.

FIG. 5 shows a block diagram of a robot simulator 135. In the preferred embodiment, the robot simulator 135 consists of a simulated controller 510 and robot dynamics model 520. The simulated controller 510 is a program which aims to replicate the behavior of the robot controller 138. The simulated controller 510 may produce input for the robot dynamics model. The robot dynamics model 520 is a program based on known formulas and the laws of physics, which aims to replicate the dynamics behavior of the physical robot 195. The robot simulator produces one or more simulator robot states 310. Ideally, the simulator robot states 310 are the same as the real robot states 320, when the robot simulator 135 and the robot controller 138 and physical robot 195 are given the same task description 131, control parameters 132, and physical parameters 133 as input.

Figure 6:
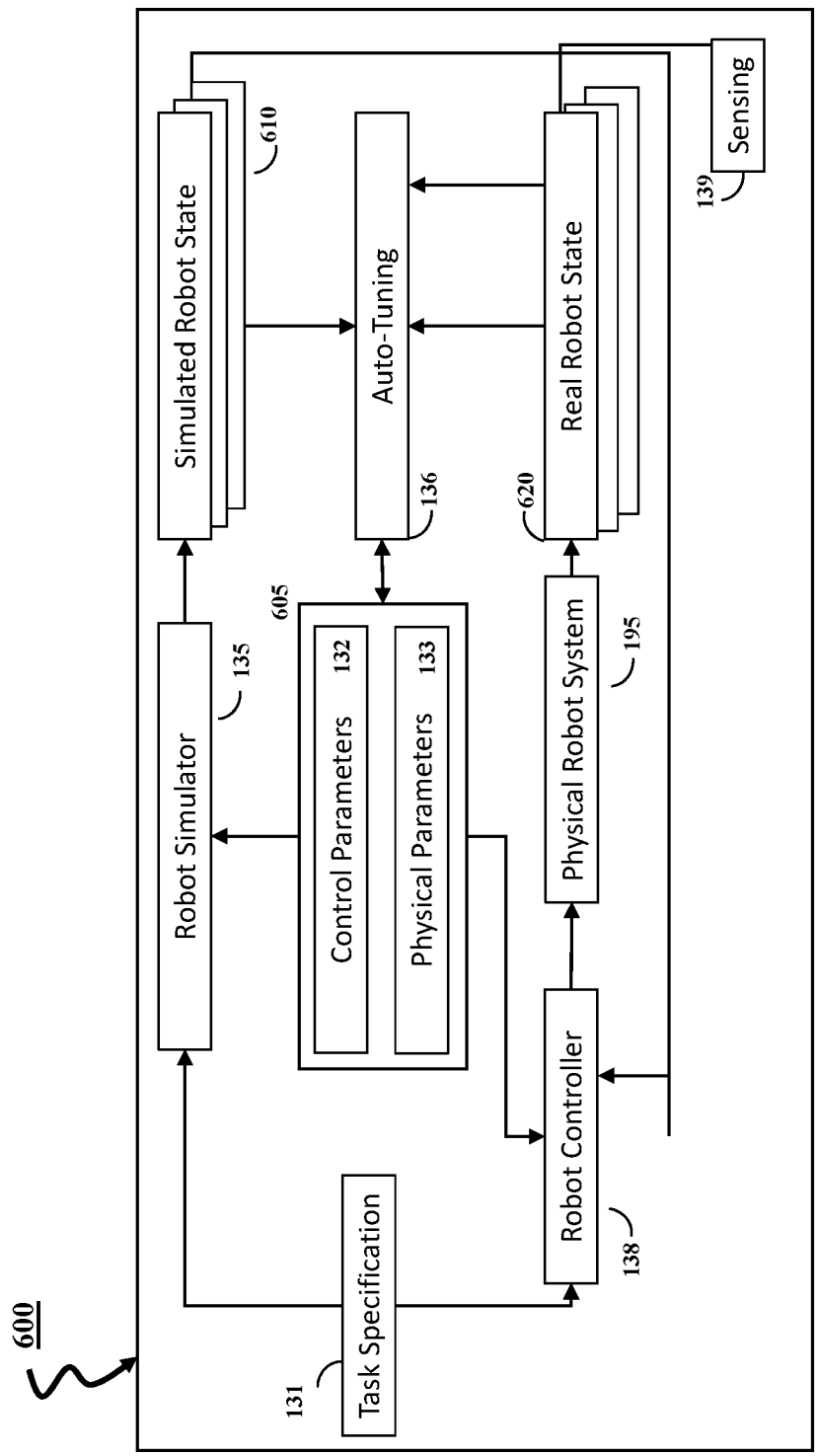
FIG. 6 shows a process flow of the parameters tuning system, according to some embodiments of the present invention.

FIG. 6 shows a process flow 600 of the parameters tuning system 100. The robot simulator 135 and the robot controller 138 receive a task description 131. The robot simulator 135 and robot controller 138 further take as input a set of parameters 605 which consist of control parameters 132 and physical parameters 133. The robot simulator 135 simulates the execution of the task, which produces one or more simulated robot states 610. A simulated robot state is the same collection of values as robot state 260, but the states are generated by the robot simulator 135 and the actual values may differ from the real robot states 620 values. The robot controller 138 provides commands to the physical robot system 195 which in turn produces one or more real robot states 620. Each state in the real-robot state is also an instance of robot state 260. An auto-tuning 136 takes the current parameters 605, the simulated robot states 610 and physical robot states 620 as input and updates the parameters 605 in an optimal manner to execute the specified task 131 with highest performance and with the robot simulator 135 to behave as similar as possible to the real robot 195. The auto-tuning 136 can also take as input information from the environment sensors 139 to measure the difference in the executed performance or measured robot state and the desired performance. The updated parameters are then stored for a next iteration. A next iteration may be a next time step in a trajectory, or a next trajectory altogether. The auto-tuning 136 may take one or more states from simulated robot states 610 and real robot states 620. We next explain the optimization approach for auto-tuning 136.

Inverse and Forward Equations of Motion

In the preferred embodiment we consider a rigid arm robot model of the form $$H(q,p_1)\ddot{q}+C(q,\dot{q},p_2)\dot{q}+G(q,p_3)=\tau \quad (2)$$

Equation 1 is known as the inverse dynamics [1], which given a desired joint angle configuration $q \in \mathbb{R}^n$, where n is the number of joints, produces torques, or torque forces, $\tau \in \mathbb{R}^n$. In equation (1) $\dot{q}$ denotes the angular velocity, and $\ddot{q}$ denotes the angular acceleration, i.e., they are the first and second derivative of q with respect to time. In equation (1), H denotes the inertia matrix and C is the Coriolis matrix for the robot. The vector $C(q,\dot{q},p_2)\dot{q}$ gives the Coriolis and centrifugal force terms. G includes the gravity terms and other forces which act on the joints. The computed torques $\tau$ are used to drive the actuators for the joint motors to achieve the desired joint angles specified by q. The $p_1$, $p_2$, $p_3$ in equation (1) represent physical parameters 133 of the system. Physical parameters may include mass, inertia, length, friction coefficients, etc. The inverse dynamics represents the mapping $(q,\dot{q},\ddot{q}) \rightarrow \tau$.

Conversely the forward dynamics represents the mapping $\tau \rightarrow (q,\dot{q},\ddot{q})$. The forward dynamics [1] are also known as the equations of motion and can be derived from equation (2):

$$\ddot{q}=H^{-1}(q,p_1)\{\tau-C(q,\dot{q},p_2)\dot{q}-G(q,p_3)\} \quad (3)$$

$$\dot{q}=\int \ddot{q} dt \quad (4)$$

$$q=\int \dot{q} dt \quad (5)$$

Figure 7:
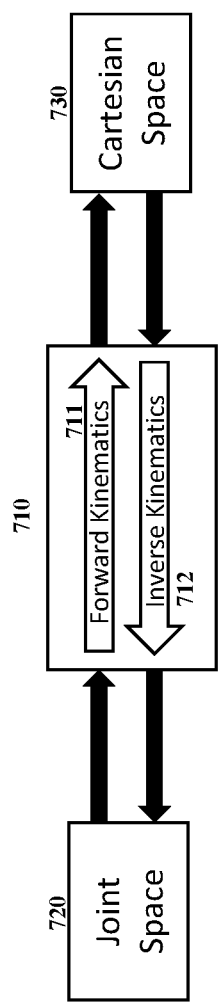
FIG. 7 shows a schematic of using the kinematics equations to transform between joint and Cartesian space, according to some embodiments of the present invention.

Given a desired trajectory $q_d$, equation (1). If $q_d$ is defined in joint space, we can use the forward kinematics equations [1] to calculate the desired trajectory of the robot's end effector in Cartesian space. We refer to this desired trajectory in Cartesian space as $y_d$. FIG. 7 shows a schematic of using the kinematics equations 710, [1], to go from joint space 720 to Cartesian space 730, via the Forward Kinematics 711, or from Cartesian space 730 to joint space 720, via the Inverse Kinematics 712. We assume that the desired output trajectories $y_d$ are smooth functions of time, relating desired initial points at t=0, $y_d(0)$, to desired final points at $y_d(t_f)$. We note that since the desired trajectory $q_d$ was determined according to the task description 131, control parameters 132 and physical parameters 133 and satisfied the task constraints and control objective, the trajectory $y_d$ also satisfies the task constraints and control objective.

We associate with the robot dynamics model (2) the controlled output $$y=O(q_d) \in \mathbb{R}^m \quad (6)$$

where O denotes some mapping. In the preferred embodiment the mapping is from the joint space to the Cartesian space, e.g., geometric mapping between the robot angles and the end-effector coordinates. Controlled output is the output from sending commands using the control commands generator 320, to the physical robot 195 and receiving robot state 260.

In one embodiment the controlled output y is received from the robot encoders. In another embodiment the controlled output y is recorded by environment sensors 193. In one embodiment the environment sensors 193 comprises of an accelerometer attached to the end effector, whereas in another embodiment the environment sensors 193 include a camera-based position tracking device which tracks the Cartesian position of the robot's end effector.

Problem Formulation

As mentioned earlier, due to dynamics, constraints, and reality gap, the controlled output y may not be able to accurately track $y_d$. Given the received robot states 260, the PID controllers in 320 will make necessary corrections to deviations from the desired trajectory, however this may lead to a reduction in performance. Our goal is to track $q_d$ or $y_d$ as close as possible, since that will lead to optimal performance. We propose to transform the desired trajectory $q_d$ or $y_d$ such that the reduction in performance is minimal. We define a mapping $\hat{O}$ as the composition of two functions P and Q:

$$\hat{O}(p_4,q)=Q \circ P \circ q \quad (7)$$

where ○ denotes composition. The functions P or Q may contain a transformation with associated control parameters $p_4$, which gives:

$$\tilde{y} = \hat{O}(p_4, q_d) \in \mathbb{R}^m \tag{8}$$

The goal is to produce a transformed controlled output $\tilde{y}$ which is as close as possible to $y_d$. For example, the transformed output leads to fewer oscillations to track a target position and therefore a reduction in the execution cycle. An example of $\hat{O}$ could be $\hat{O}=Q*P$ with $Q=F(p_4)$ and $P=O(q_d)$, i.e. a convolutional filtering of the controlled output y. In another embodiment $\hat{O}=Q(P)$ where $P=N(p4,q_d)$ and $Q=O(P)$, i.e. a neural network N is parameterized with parameters $p_4$, to either transform or produce the controlled output. We associate the parameters $p_1$, $p_2$, $p_3$ with the physical parameters 133 and parameters $p_4$ with the control parameters 132.

An approach for tuning the parameters may be to tune the physical parameters 133 for the real-world robot without using a simulator. On the other hand, one may tune the parameters 133 for the simulated robot just once, to closely match the dynamics of the real-world robot. However, regular wear and tear over time may affect the physical properties of the real-robot and thus its performance. Furthermore, different task constraints and workspace configurations (e.g. start and goal positions) may also affect the behavior. The tuned parameters for the simulated robot would no longer closely match the dynamics of the real-world robot. Another approach for tuning may be to consider the control parameters 133 without tuning other parameters.

Instead, our objective is to design an auto-tuning process which, given a task specification 131, simultaneously determines optimal values for the physical parameters 133 and control parameters 132. In the preferred embodiment this means that we aim to auto-tune $(p_1, p_2, p_3, p_4)$ from the above equations. We propose an iterative approach using optimization with the robot simulator 135 in the loop for the auto-tuning.

Optimization-Based Auto-Tuning Design

We define the following cost function:

$$J(\Delta) = C(e_y(\Delta), \dot{e}_y(\Delta), \ddot{e}_y(\Delta)) \tag{9}$$

where $$e_y = \tilde{y} - y_d \in \mathbb{R}^m \tag{10}$$

defines the tracking error, $\Delta$ is a vector containing the parameters that we want to auto-tune, and mapping function $C: \mathbb{R}^n \to \mathbb{R}$, $C(0)=0$, $C(z)>0$ for $z \neq 0$. We assume the cost function J has a local minimum at $\Delta^*$. We then formulate the optimization-based auto-tuning problem as:

$$\min_{\Delta=(p_1,p_2,p_3,p_4)^T} J(\Delta) \tag{11}$$

under the constraints given by equations (2), (8), (10) and:

$$p_i = p_i^{nominal} + \delta p_i \tag{12}$$

where $p_i^{nominal}$, i=1,2,3,4 are the nominal values of the parameters, which can be obtained off-line from the robot's manufacturer, or by manual tuning/measurements, or by formulating a similar optimization problem where the parameter vector is $\Delta = (p_i^{nominal})$, i=1,2,3,4.

Choice of Cost Function J

One choice of the cost function J is as follows:

$$J_1(\Delta) = \int_0^{tf}(\|e_y(\Delta)\|_{Q_1}^2 + \|\dot{e}_y(\Delta)\|_{Q_2}^2 + \|\ddot{e}_y(\Delta)\|_{Q_3}^2)dt, Q_1, Q_2, Q_3 > 0 \tag{13}$$

This cost function target is a precise tracking of the desired filtered reference defined by equation (8), where the tracking error can be based on states of the robot and environment sensor measurements (for example, laser displacement sensors, accelerometer, camera sensors, etc.).

Another choice of the cost function J is $$J_2(\Delta) = \int_0^{tf}(\|e_q(\Delta)\|_{Q_1}^2 + \|\dot{e}_q(\Delta)\|_{Q_2}^2)dt, Q_1, Q_2 > 0 \tag{14}$$

where $e_q = q_m - q_s$, $q_m$ are the measured states of the robot 610, and $q_s$ are the simulated states of the robot 620. This cost function target is mainly to improve the system model accuracy, i.e., the (dynamic) behavior of the robot and simulator being the same.

Simulation-In-the-Loop Optimization

Figure 8:
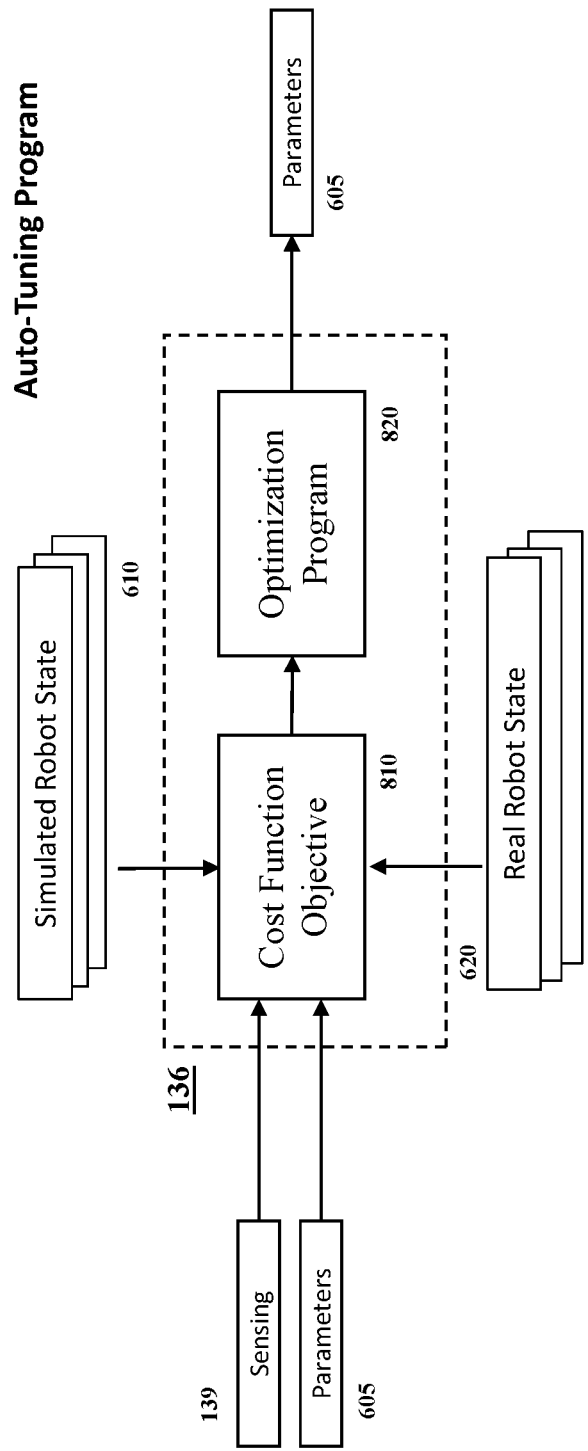
FIG. 8 depicts the control flow diagram for the auto-tuning with simulation-in-the-loop optimization, according to some embodiments of the present invention.

FIG. 8 depicts the control flow diagram for the auto-tuning with simulation-in-the-loop optimization. The auto-tuning 136 takes as input the parameters 605, the environment sensors 139, simulated robot states 610, and real robot states 620. The inputs are used to determine a cost function objective 810. The cost function objective 810 is used by the optimization program 820 to produce updated parameters 820. The auto-tuning 136 is an iterative process which iterates over simulated robot states 610 and real robot states 620.

One can combine both cost functions from equations (13) and (14) for simultaneous update and auto-tuning with optimization of physical parameters 133 and control parameters 132. For the cost function objective 810, the cost function J for simulation-in-the-loop optimization of physical parameters and control parameters can be written as:

$$J_3(\Delta) = J_1 Q_1 + J_2 Q_2, Q_1, Q_2 > 0 \tag{15}$$

where $Q_1$ and $Q_2$ are weights to trade-off between cost functions $J_1$ and $J_2$.

The optimization problem formulated above, can be solved using a suitable optimization algorithm. The optimization program 820 can be based on the Extremum Seeking algorithm [2], which is a data-driven approach. The Extremum Seeking can be formulated to solve the optimization problem presented in this invention as:

$$\dot{x}_i = a_i \sin\left(\omega_i t + \frac{\pi}{2}\right) J(\Delta) \tag{16}$$

$$\Delta_i(t) = x_i + a_i \sin\left(\omega_i t - \frac{\pi}{2}\right), i \in \{1, 2, \cdots, m\} \tag{17}$$

$$\omega_i \neq \omega_j, \omega_i + \omega_j \neq \omega_k, i, j, k \in \{1, 2, \cdots, m\} \tag{18}$$

$$\omega_i > \omega^*, \forall i \in \{1, 2, \cdots, m\} \tag{19}$$

with J as the cost function and $\omega^*$ large enough. It is understood that any other suitable optimization approach may be used instead.

The optimization takes into consideration the overall robot model and the control objectives related to the task and performs auto-tuning of the parameters to arrive at optimum control and system model parameters, i.e., control and physical parameters. The optimization process is an iterative process which is repeated while the robot is operational until the cost objectives of the optimization are met.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component. Though, a processor may be implemented using circuitry in any suitable format.

Also, the embodiments of the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

We claim:

1. A system, comprising:

One or more data processors; and a memory storage in data communication connection with the one or more data processors, wherein the memory store computer-executable instructions and programs including a robot simulation module and an auto-tuning module, and upon execution cause the data processors to perform operations comprising:

obtaining, by a parameter tuning system operating a real-world robot, a simulated robot, and a plurality of environment sensors, a task description, a plurality of current physical parameters for the joints of the real-world robot and the simulated robot, real-robot states, and simulated robot states;

adjusting, by the parameter tuning system and using the measurements of the plurality of physical parameters, control parameters, sensor measurements, real-robot states, and simulated robot states, an estimate of one or more physical parameters of the real-world robot to simulate the real-world robot and an estimate of one or more control parameters, wherein the estimate of one or more control parameters are used by both the real-world robot and the simulated robot for satisfying a plurality of the task description constraints;

determining, by the parameter tuning system and using the robot simulator and the task description along with a current estimate of the physical parameters and control parameters, a respective plurality of simulated control parameters and simulated robot states, and by using the real-world robot, the task description, and a plurality of environment sensors in accordance with respective simulated control parameters, real-robot states and a plurality of environment sensor measurements;

adjusting, by use of a predetermined optimization algorithm in the parameter tuning system, the current estimate of the one or more control parameters and the current estimate of the one or more physical parameters to minimize a weighted summation of the differences between the desired and measured joint physical parameter value of each joint of the real-world robot and the summation of differences between the real-world robot and simulated-robot states, wherein the predetermined optimization is formulated to minimize a cost function objective, wherein the cost function objective is a combination of one or more cost functions objectives related to physical parameters and control parameters, wherein the control parameters relate to a convolutional filter, wherein the convolutional filter is a moving average filter.

2. The system of claim 1, wherein the real-world robot states include joint position measurements, and/or joint velocity measurements, and/or joint torque measurements, and the simulated robot states include simulated joint position measurements, and/or simulated joint velocity measurements, and/or simulated joint torque measurements.

3. The system of claim 1, wherein the robot simulation module includes kinematics and dynamics model of the real-world robot, one or more nominal values of physical parameters of the real-world robot, a trajectory generation module, an initial filter specification, wherein the robot simulation module is configured to simulate the real-world robot.

4. The system of claim 1, further comprising to acquire one or more environment sensors measurements.

5. The system of claim 4, wherein the environment sensors are one or more accelerometers.

6. The system of claim 4, wherein the environment sensors are one or more laser displacement sensors.

7. The system of claim 4, wherein the environment sensors is a position tracking device.

8. The system of claim 7, wherein the position tracking device is camera-based.

9. The system of claim 1, wherein a robot controller is stored in memory as a computer-executable program.

10. The system of claim 1, wherein the predetermined optimization is solved using an Extremum Seeking approach.

11. The system of claim 10, wherein the physical parameters comprise one or more of link lengths, link masses, center of mass, inertia tensor, load dimensions, load mass, load inertia tensor, and joint friction.

12. The system of claim 1, wherein the task description contains task objectives and task constraints.

13. The system of claim 1, wherein the physical parameters contain parameters related to the kinematics and dynamics of the real-world robot.

14. The system of claim 1, wherein the cost function objective relates to physical parameters.

15. The system of claim 1, wherein the control parameters comprise one or more parameters to transform or generate a desired trajectory.

16. The system of claim 1, wherein the control parameters comprise one or more parameters to transform or generate a desired trajectory.

17. The system of claim 1, wherein the control parameters relate to parameters of a neural network, where the neural network represents a control policy.

18. The system of claim 1, wherein the robot controller comprises a trajectory generator and a control commands generator configured to take as input, the output of the trajectory generator and the real-robot states.

19. The system of claim 18, wherein the trajectory generator comprises a planner, a command shaping, and a trajectory time scaling, configured to take as input a task specification, a plurality of physical parameters and a plurality of control parameters and generate as output a desired trajectory.

20. The system of claim 18, wherein the desired trajectory comprises a collection of scalar or vector values at discrete time steps.

21. The system of claim 18, wherein the desired trajectory relates to the highest robot performance according to a task specification.

22. The system of claim 18, wherein a real robot is configured to follow the desired trajectory.

23. The system of claim 1, wherein the robot simulator comprises a simulated controller and a robot dynamics model, configured to produce one or more simulated robot states.

24. The system of claim 23, wherein the robot dynamics model is based on the forward and inverse equations of motion.

25. A method comprising:
obtaining, by a parameter tuning system operating a real-world robot, a simulated robot, and a plurality of environment sensors, a task description, a plurality of current physical parameters for the joints of the real-world robot and the simulated robot, real-robot states, and simulated robot states;
adjusting, by the parameter tuning system and using the measurements of the plurality of physical parameters, control parameters, sensor measurements, real-robot states, and simulated robot states, an estimate of one or more physical parameters of the real-world robot to simulate the real-world robot and an estimate of one or more control parameters, wherein the estimate of one or more control parameters are used by both the real-world robot and the simulated robot for satisfying a plurality of the task description constraints;
determining, by the parameter tuning system and using the robot simulator and the task description along with a current estimate of the physical parameters and control parameters, a respective plurality of simulated control parameters and simulated robot states, and by using the real-world robot, the task description, and a plurality of environment sensors in accordance with respective simulated control parameters, real-robot states and a plurality of environment sensor measurements;
adjusting, by use of a predetermined optimization algorithm in the parameter tuning system, the current estimate of the one or more control parameters and the current estimate of the one or more physical parameters to minimize a weighted summation of the differences between the desired and measured joint physical parameter value of each joint of the real-world robot and the summation of differences between the real-world robot and simulated-robot states, wherein the predetermined optimization is formulated to minimize a cost function objective,
wherein the cost function objective is a combination of one or more cost functions objectives related to physical parameters and control parameters, wherein the control parameters relate to a convolutional filter, wherein the convolutional filter is a moving average filter.

26. The method of claim 25, wherein the real-world robot states include joint position measurements, and/or joint velocity measurements, and/or joint torque measurements, and the simulated robot states include simulated joint position measurements, and/or simulated joint velocity measurements, and/or simulated joint torque measurements.

27. The method of claim 25, wherein the robot simulation module includes kinematics and dynamics model of the real-world robot, one or more nominal values of physical parameters of the real-world robot, a trajectory generation module, an initial filter specification, wherein the robot simulation module is configured to simulate real-world robot.

28. The method of claim 25, wherein one or more physical properties include one or more of a real-world physical robot's link lengths, link masses, center of mass, and/or inertia tensor, load dimensions, load mass and/or inertia tensor.

* * * * *